United States Patent [19]

McCuistion, III et al.

[11] Patent Number: 5,265,371

[45] Date of Patent: Nov. 30, 1993

[54] BOX SHAPED RAT TRAP

[76] Inventors: Alvin J. McCuistion, III; Susie L. Roeder, both of 449 Harrison Ave., Campbell, Calif. 95008

[21] Appl. No.: 901,784

[22] Filed: Jun. 22, 1992

[51] Int. Cl.5 ............................................. A01M 23/06
[52] U.S. Cl. .......................................................... 43/70
[58] Field of Search .................... 43/70, 71, 72, 73, 74, 43/69, 66

[56] References Cited

U.S. PATENT DOCUMENTS

| | | | |
|---|---|---|---|
| 2,733,541 | 2/1956 | McKim | 43/70 |
| 4,062,142 | 12/1977 | Marotti | 43/61 |
| 4,429,483 | 2/1984 | Murakami | 43/70 |
| 4,553,349 | 11/1985 | Tsai | 43/70 |
| 5,040,326 | 8/1991 | Van Dijnsen et al. | 43/65 |

Primary Examiner—Mark Rosenbaum
Assistant Examiner—Jeanne M. Elpel
Attorney, Agent, or Firm—John P. Halvonik

[57] ABSTRACT

The invention is a rat and mouse trap that springs open a pair of doors that lead to a containment area for either killing the rats or capturing the them alive. The device uses a box shaped compartment having a pair of doors in the center and held closed by a latch on each of the doors. The latch is attached to a solenoid activated pivoting means that disengages the latch from the doors to allow them to open temporarily to drop the rat into the containment chamber below. The solenoid means is operated by a microswitch in connection with bait over the doors. Upon touching the bait, the microswitch sends an electric signal to the solenoid which pivots and pulls both latches away from the doors and holds them open long enough for the rat to drop into the containment area below.

3 Claims, 3 Drawing Sheets

BOX SHAPED RAT TRAP

BACKGROUND

1. Field of the Invention

The invention relates to field of vermin destroying devices and, in particular, to a rat or mousetrap having a pair of slidable or pivotal doors on the top surface of a containment chamber with the doors being activated electrically by a microswitch in connection with a solenoid.

2. Prior Art

While there are vermin catching traps that exist, none that applicant is aware of are operated by a microswitch in connection with the bait to open a pair of doors for depositing the rat in a box for removal. Nor are there any that applicant is aware of with poisonous gas for the destruction of parasites on the rats.

SUMMARY OF THE INVENTION

The rat trap of the present invention comprises a box-shaped containment chamber having a pair of doors pivotally located on the upper wall which provide entrance to an inner chamber where the rats can either be poisoned or captured alive. The inner chamber may be removed for disposal of the rats. The doors are operated by latches which disengage from the doors in response to movement of a pivoting means upon an electric signal. The signal is sent by a microswitch which is triggered by movement of bait placed on or near the doors. The microswitch activates a solenoid which operates the pivoting means that disengages the doors allowing them to swing open and the rat drops into the interior of the containment chamber. Springs on the doors urge them back into the ready position after the rat falls through.

It is the object of the invention to provide a storage chamber for dead or captured rats that can easily be removed for ready disposal.

Another objective is to provide a fool proof activation system for triggering a set of doors in connection with a containment chamber to capture or kill rats.

Still another objective is to provide a rat trap that can be used with minimal attendance for upkeeping, removal and other operations.

Yet another objective is to provide a rat trap that eliminates the hazards of parasites, diseased rats, etc. in the handling and disposal of rats taken with a trap.

Other objectives of the invention will become apparent once the invention is shown and described.

DESCRIPTION OF THE PREFERRED EMBODIMENT

Figure 1:
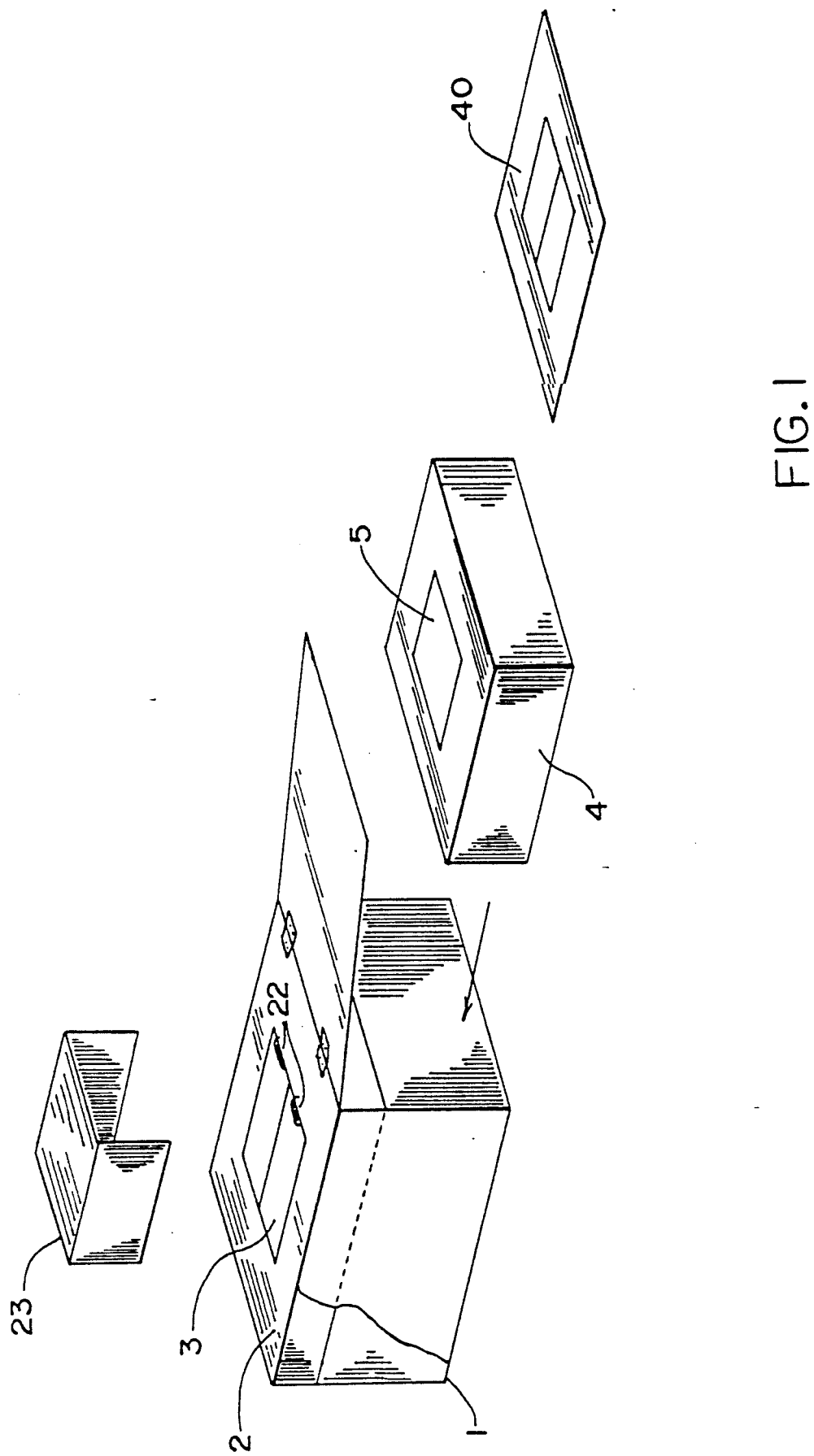
FIG. 1 shows the overall construction of the rat trap.

The main structure of the apparatus is the containment chamber 1 which is, preferably, of box like construction with the upper wall 2 of the box having an aperture (preferably rectangular in shape) covered by a set of double doors 3. The doors open to permit a rat or other animal to drop into an inner containment chamber 4 inside the containment chamber. The inner chamber may be built as a structure separate from the containment chamber and may contain pesticides or other poisons to kill the rat and attendant parasites, etc. on the rat upon his arrival in the inner chamber. The inner chamber should also have an aperture 5 to allow vermin to drop into the inner chamber through the double doors 3.

It is preferred that the inner chamber be built as a separate and removable structure inside the containment chamber in order to be removable so that one can dispose of the rats, dead or alive by removing this inner chamber from the device.

Figure 2:
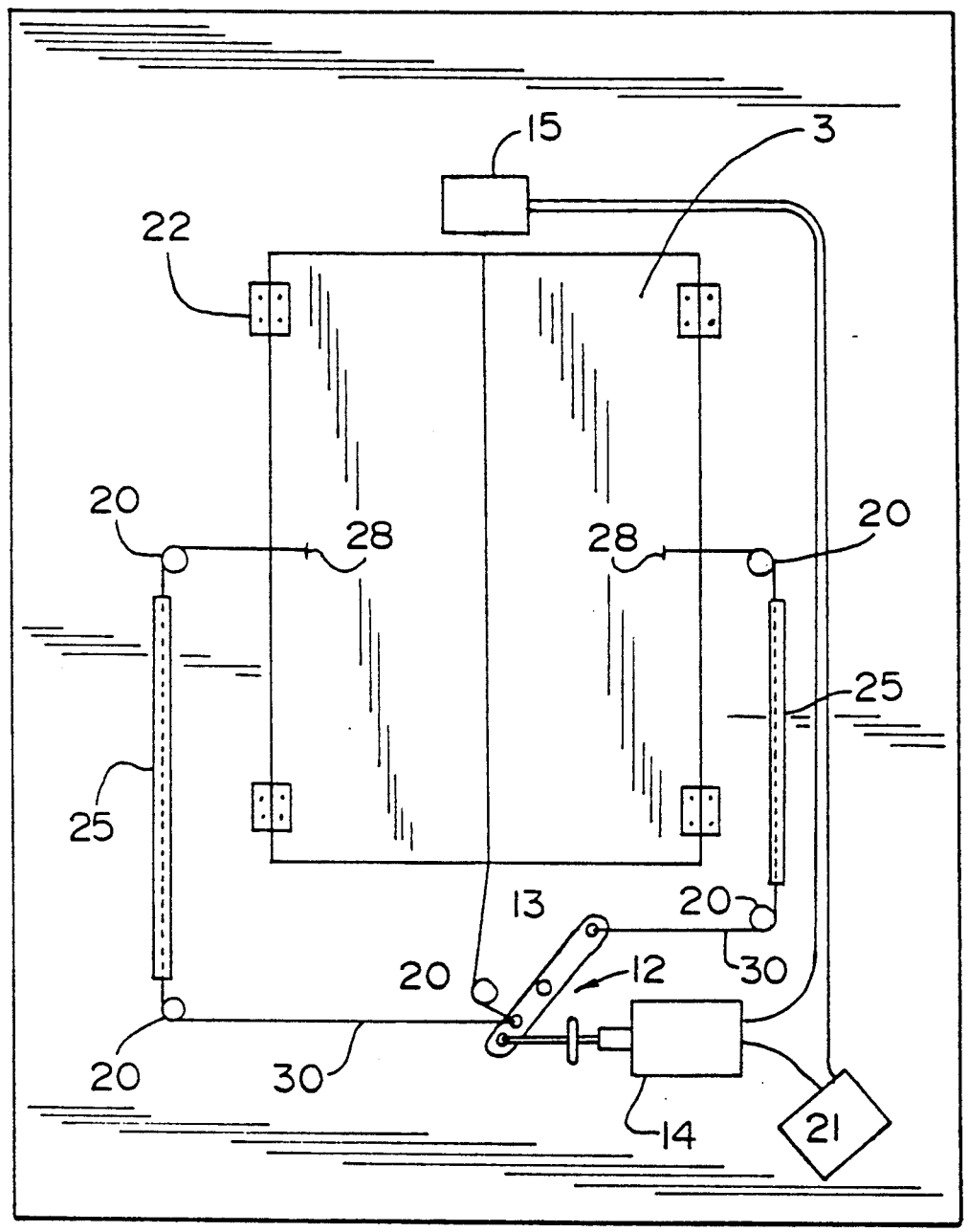
FIG. 2 shows details of closing mechanism from above.
Figure 4:
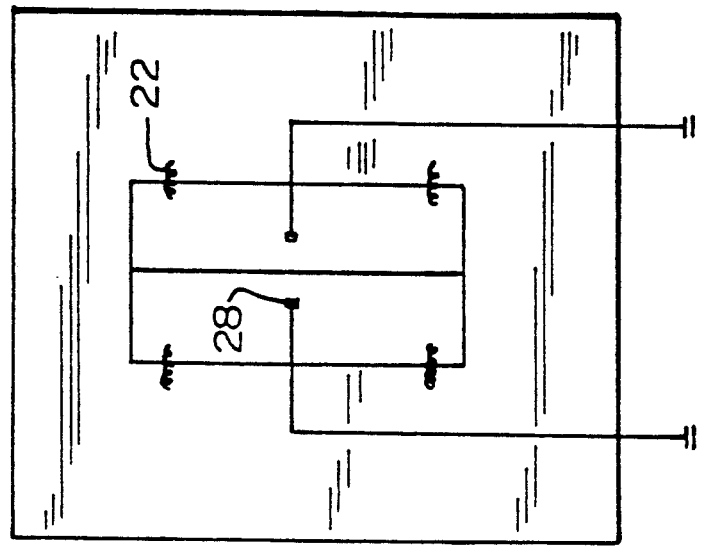
FIG. 4 shows the underside of the doors.
Figure 3:
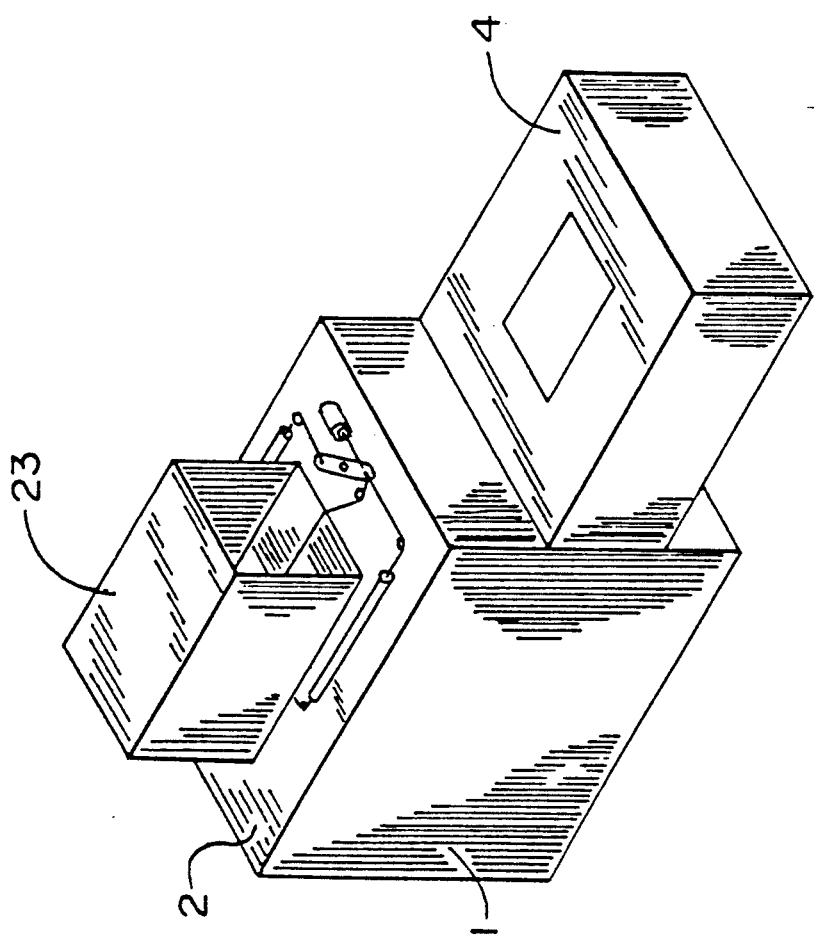
FIG. 3 shows trap as constructed with inner chamber about to be set in place.

The aperture in the upper wall is rectangular in shape and a set of doors 3 cover this aperture when the device is in the "standby mode" which means it is set to catch vermin. Refer to FIG. 2. The doors are pivotally connected to the sides of the aperture and latches 28, 11 in connection with each door keep them in place, otherwise gravity might force the doors open. In the standby mode, the latches are preferably under the doors waiting to be unlatched. The latches are connected to a pivoting apparatus 12 through cables 13, 30 or other connecting means. The pivot is in connection with a solenoid 14 that will periodically be energized by an electrical signal from a micro switch 15 when an animal is on the doors. Once the solenoid is energized the pivot will pull on the latches through the cables and the doors will come open.

The cables 30 (wire, rope, steel, etc.) connected to the pivoting means are run along the upper wall and to one side or the other of the doors. The cables may be on pulleys 20 to enable the cables to be run at sharp corners around the corners of the doors, etc. One end of each cable is attached to one end of the pivoting means and the other end of the cable is in connection with one of the latches on each door. In the standby position, with the doors closed, the pivot is fully pivoted in one direction, see FIG. 2.

The pivot may be spring loaded to stay in this position. This position keeps the doors closed via the latches under each door (or whatever connection the latches may have with the doors) until the trap is sprung. In the activation mode, an electric signal from a micro switch 15 in connection with bait in the area above the doors will activate the solenoid to pivot the pivoting means. This action will pull the latches away from the doors via the movement of the cables and allow the doors to pivot open.

The microswitch is in connection with some sort of bait attractive to the rat and located above or on the doors. Upon the rat or other animal touching the bait, the microswitch will be triggered and a signal will be sent to the solenoid, this moves the latches which cause the doors to open. The latches would preferably be connected to the doors so that the force of the solenoid will pull the doors open and hold them open for as long as the solenoid is activated by the microswitch. A battery 21 in this circuit powers the solenoid. The electrical circuit is only completed when the microswitch is activated.

The doors may be reset by springs 22 in connection with the doors. Such springs may be located on the upper wall of the chamber and are such that they continually urge the doors closed. This force from the springs must be not so much as to prevent the doors from swinging open when the latches are activated. At that point the weight of the rat and the force of the solenoid must be enough to urge the doors open by overcoming the force of the return spring.

With rat dropped in the inner chamber, the weight on the doors is gone and the springs then operate to reset the doors back in position. The pivoting means deactivates when the microswitch stops receiving movements due to the rat no longer nibbling on the bait. Thus the latches swing back into place and the doors are reset. The solenoid operates only for a short time but long enough to keep the doors open to allow the rat to drop in. After that, the reset means takes over and pulls the doors closed.

The doors may be of several configurations with pivoting doors preferred. Pivoting doors would pivot downward upon opening and resilient means in connection with the doors would bring them closed again. Sliding doors would move under the top wall to expose the rat to the aperture and into the inner chamber. These would also be reset with springs.

An upper enclosure 23 may be added over the top wall to channel the rats toward the bait and doors. The upper enclosure would have three side walls and an upper wall—i.e.: an enclosed portion with an entrance at the side without the wall. The upper enclosure is attached to the upper wall of the box to thus cover the entrance to the doors, except for the one open side of the enclosure. The enclosure permits the rats access to the bait once they go through the enclosure. The enclosure may also include a separate and optional compartment 24 to hold the microswitch and/or the pivoting means and solenoid.

Conduits 25 made of material that is resistant to gnawing or chewing of rats should be placed around all the cables or other connecting lines that may be susceptible to rat damage. Rats may chew or gnaw electrical lines or other lines which are exposed, this would render the device inoperable. The conduits are preferably made of rat resistant material e.g. metals such as aluinum, iron or steel or pehaps other materials. The conduits should cover the electrical lines as well as the cables that lead from the doors to the pivoting means.

A protective sheet 40 of plastic or other material may be used in connection with the inner chamber. The sheet should be placed between the upper wall of the containment chamber and the inner chamber with an aperture to allow for the pivoting doors. This sheet should prevent contamination of the upper wall by dead rats inside the inner chamber.

A chlorine gas dispensing means may be used in connection with the inner chamber to kill rats and attendant parasites as the rats are dumped in the inner chamber.

I claim:

1. A vermin trap comprising: a rat containment compartment having side walls and a top wall, said top wall having an aperture, a set of double doors attached to said aperture and pivotally mounted within said aperture, a pair of latch means each in connection with one of said doors so that said latch means may keep said doors closed, a pivoting means having two ends, each of said ends in connection with one of said latch means by a connecting means so that said pivot means may pull said latch means in order to open said doors, solenoid in connection with said pivoting means for pivoting said pivoting means upon said solenoid being energized by an electric signal, microswitch positioned above said doors and having a means for sending an electrical signal to said solenoid upon said microswitch being moved, an upper enclosure having three side walls and an upper wall, said enclosure placed in connection with said top wall of said compartment and overlying said trap doors.

2. The apparatus of claim 1 wherein said connecting means are covered by conduits made of rat resistant material.

3. The apparatus of claim 2 having an inner chamber within said rat containing compartment, said chamber removable from said compartment for disposal of said rats.

* * * * *